(12) United States Patent
Du et al.

(10) Patent No.: US 12,372,848 B2
(45) Date of Patent: Jul. 29, 2025

(54) OPTICAL MODULATOR AND CONTROL METHOD THEREFOR

(71) Applicant: ZTE CORPORATION, Shenzhen (CN)

(72) Inventors: Jiangbing Du, Shenzhen (CN); Haining Chong, Shenzhen (CN); Weihong Shen, Shenzhen (CN); Zuyuan He, Shenzhen (CN); Ningfeng Tang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 392 days.

(21) Appl. No.: 17/999,265

(22) PCT Filed: May 17, 2021

(86) PCT No.: PCT/CN2021/094214
§ 371 (c)(1),
(2) Date: Nov. 18, 2022

(87) PCT Pub. No.: WO2021/233268
PCT Pub. Date: Nov. 25, 2021

(65) Prior Publication Data
US 2023/0194907 A1 Jun. 22, 2023

(30) Foreign Application Priority Data
May 21, 2020 (CN) .................. 202010437061.X

(51) Int. Cl.
*G02F 1/21* (2006.01)
*G02F 1/225* (2006.01)

(52) U.S. Cl.
CPC ............ *G02F 1/2257* (2013.01); *G02F 1/217* (2021.01); *G02F 2201/17* (2013.01); *G02F 2203/15* (2013.01)

(58) Field of Classification Search
CPC ........ G02F 1/015; G02F 1/025; G02F 1/2257; G02F 1/217; G02F 2201/17; G02F 2203/15; G02B 6/14
(Continued)

(56) References Cited

U.S. PATENT DOCUMENTS

| | | | |
|---|---|---|---|
| 9,122,004 B1 | 9/2015 | Roth et al. | |
| 11,675,132 B2 * | 6/2023 | Fini | ..................... G02B 6/2934 385/3 |

(Continued)

FOREIGN PATENT DOCUMENTS

| | | |
|---|---|---|
| CN | 101261222 A | 9/2008 |
| CN | 203465196 U | 3/2014 |

(Continued)

OTHER PUBLICATIONS

International Searching Authority. International Search Report and Written Opinion for PCT Application No. PCT/CN2021/094214 and English translation, mailed Jul. 29, 2021, pp. 1-9.

(Continued)

*Primary Examiner* — Robert Tavlykaev
(74) *Attorney, Agent, or Firm* — Vivacqua Crane, PLLC

(57) ABSTRACT

Disclosed are an optical modulator and control method therefor, the optical modulator includes an input waveguide, an adjustable ring-shaped resonant cavity, a feedback loop waveguide, a first mode converter, and an output waveguide. The input waveguide is configured to receive an initial optical signal, the adjustable ring-shaped resonant cavity is configured to perform resonance and modulation processing on the initial optical signal and output a first optical signal, the feedback loop waveguide is configured to receive and transmit the first optical signal, the first mode converter is configured to perform mode conversion processing on the first optical signal and output a second optical signal to the (Continued)

adjustable ring-shaped resonant cavity, the adjustable ring-shaped resonant cavity is further configured to perform resonance and modulation processing on the second optical signal and output a third optical signal, and the output waveguide configured to receive and output the third optical signal.

14 Claims, 7 Drawing Sheets

(58) Field of Classification Search
USPC .............................. 385/1–4, 14, 15, 32, 42
See application file for complete search history.

(56) References Cited

U.S. PATENT DOCUMENTS

| | | | |
|---|---|---|---|
| 2010/0260453 A1* | 10/2010 | Block ................... | G02B 6/2934 385/24 |
| 2010/0266232 A1* | 10/2010 | Lipson .................... | G02F 1/025 385/2 |
| 2010/0316325 A1 | 12/2010 | Okamoto et al. | |
| 2012/0002694 A1 | 1/2012 | Bowers et al. | |
| 2014/0161384 A1 | 6/2014 | Dwivedi et al. | |
| 2014/0321848 A1 | 10/2014 | Sekiguchi | |
| 2016/0025928 A1 | 1/2016 | Onawa | |
| 2017/0068048 A1* | 3/2017 | Kamei .................. | G02B 6/1228 |
| 2017/0176681 A1 | 6/2017 | Kusaka et al. | |
| 2017/0276873 A1* | 9/2017 | Hu ..................... | G02B 6/29397 |
| 2020/0124883 A1 | 4/2020 | Delisle-Simard et al. | |

FOREIGN PATENT DOCUMENTS

| | | | | |
|---|---|---|---|---|
| CN | 102841406 A | * | 7/2014 | ............. G02B 6/125 |
| CN | 104949938 A | | 9/2015 | |
| CN | 105404028 B | * | 2/2018 | ............... G02F 1/01 |
| JP | 2013534059 A | | 8/2013 | |
| JP | 2014115650 A | | 6/2014 | |
| JP | 2015041070 A | | 3/2015 | |
| JP | 2016024375 A | | 2/2016 | |
| JP | 2016114763 A | | 6/2016 | |
| JP | 2018128642 A | | 8/2018 | |
| WO | 2008102511 A1 | | 8/2008 | |
| WO | 2013114578 A1 | | 8/2013 | |

OTHER PUBLICATIONS

Mu, et al. "Feedback-Coupled Waveguide Microring Resonator Based on Slot Structure," Acta Optica Sinica, vol. 39, No. 12, Dec. 2019.

Zhao, et al. "Tunable Fano resonances based on microring resonator with feedback coupled waveguide," Optics Express, vol. 24, No. 18, Sep. 2016, pp. 1-9.

European Patent Office. Extended European Search Report for EP Application No. 201809142.9, mailed Oct. 9, 2023, pp. 1-9.

Japan Patent Office. Notice of Reasons for Refusal for JP Application No. 2022-570672 and English translation, mailed Oct. 19, 2023, pp. 1-6.

* cited by examiner

OPTICAL MODULATOR AND CONTROL METHOD THEREFOR

CROSS-REFERENCE TO RELATED APPLICATION

This application is a national stage filing under 35 U.S.C. § 371 of international application number PCT/CN2021/094214, filed May 17, 2021, which claims priority to Chinese patent application No. 202010437061.X, filed May 21, 2020. The contents of these applications are incorporated herein by reference in their entirety.

TECHNICAL FIELD

Embodiments of the present disclosure relate to, but are not limited to, the field of photoelectronic devices, and in particular to an optical modulator and a control method therefor.

BACKGROUND

As the photoelectronic technology develops, silicon-based integrated photoelectronic technology, featuring the advantages of being highly integrated and CMOS process compatible and scalable production, etc., has become the mainstream research direction of integration in the field of optical communication.

In modern society, the demand for data communication capacity continues to rise, and the requirements for optical communication modules (such as optical modulators) are becoming increasingly demanding in terms of their specifications (e.g., the extinction ratio). However, optical modulators in some cases suffer from a low extinction ratio.

SUMMARY

Embodiments of the present disclosure provide an optical modulator and a control method therefor.

In accordance with a first aspect, an embodiment of the present disclosure provides an optical modulator, including: an input waveguide configured to receive an initial optical signal; an adjustable ring-shaped resonant cavity coupled to the input waveguide and configured to perform resonance processing on the initial optical signal and output a first optical signal; a feedback loop waveguide coupled to the adjustable ring-shaped resonant cavity and configured to receive and transmit the first optical signal; a first mode converter coupled to the feedback loop waveguide and configured to perform mode conversion processing on the first optical signal and output a second optical signal; the adjustable ring-shaped resonant cavity being further configured to perform resonance processing on the second optical signal and output a third optical signal; and an output waveguide coupled to the adjustable ring-shaped resonant cavity and configured to receive and output the third optical signal.

In accordance with a second aspect, an embodiment of the present disclosure provides an optical modulator control method, including: receiving an initial optical signal by an input waveguide; performing resonance processing on the initial optical signal and outputting a first optical signal, by an adjustable ring-shaped resonant cavity; receiving and transmitting the first optical signal to a first mode converter by a feedback loop waveguide; performing mode conversion processing on the first optical signal and outputting a second optical signal, by the first mode converter; performing resonance processing on the second optical signal and outputting a third optical signal, by the adjustable ring-shaped resonant cavity; and receiving and outputting the third optical signal by an output waveguide.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

Figure 1:
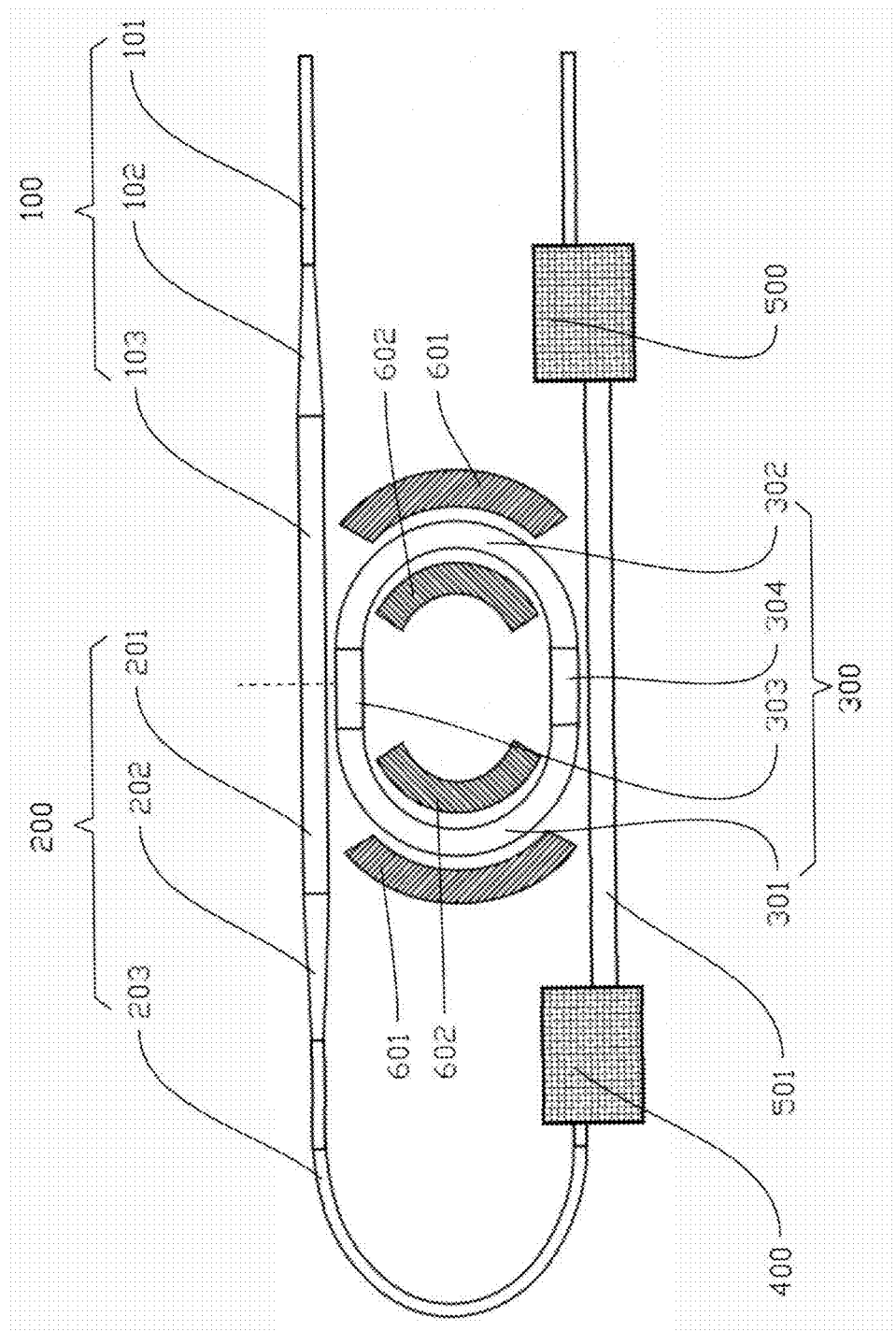
FIG. 1 is a schematic diagram of an optical modulator provided by an embodiment of the present disclosure.

Reference numerals: 100. Input waveguide; 101. Single-mode input waveguide; 102. First tapered waveguide; 103. Multi-mode input waveguide; 200. Feedback loop waveguide; 201. Feedback multi-mode waveguide; 202. Arc-shaped waveguide; 203. Second tapered waveguide; 300. Ring-shaped resonant cavity; 301. First half-ring waveguide; 302. Second half-ring waveguide; 303. First straight waveguide; 304. Second straight waveguide; 400. First mode converter; 401. First input single-mode waveguide; 402. First single-mode coupling waveguide; 403. First multi-mode coupling waveguide; 404. First conversion tapered waveguide; 405. First output multi-mode waveguide; 500. Second mode converter; 501. Output waveguide; 601. First electrode; 602. Second electrode; 6011. First metal via; 6021. Second metal via; 603. Upper cladding; 604. Lower surface; 605. Silicon substrate layer; 606. Silicon waveguide layer; 6061. First P-type heavily doped region; 6062. First P-type lightly doped region; 6063. First N-type lightly doped region; 6064. First N-type heavily doped region.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure. The embodiments of the present disclosure and the features in the embodiments may be combined with each other without conflict.

It should be noted that although a functional module division is shown in the schematic diagrams of the device and a logical order is shown in the flowcharts, the steps shown or described may be performed, in some cases, in a different module division from that of the device or in a different order from that in the flowcharts. The terms "first", "second", etc. in the description, the claims and the above-mentioned drawings are intended to distinguish between similar objects and are not necessarily to describe a specific order or sequence.

With the development of photoelectronic technology, silicon-based integrated photoelectronic technology has the advantages of being highly integrated and CMOS process compatible, and can be produced in large scale, and so on, so it has become the mainstream research direction of integration in the field of optical communication. In optical communication systems, mode multiplexing is a technique that can effectively enhance the transmission capacity of a single channel. By means of transmission of multiple modes in the same optical fiber/optical waveguide channel, the density of optical signals in the same channel is greatly increased, thus doubling the total transmission capacity. In on-chip integrated optical interconnect systems, the research of mode multiplexing devices has also become increasingly mature, which can effectively enhance the transmission density of on-chip interconnects.

In modern society, the demand for data communication capacity continues to rise, and the requirements for optical communication modules (such as optical modulators) are becoming increasingly demanding in terms of their specifications (e.g., the extinction ratio). However, optical modulators in some cases suffer from a low extinction ratio.

For example, due to the sensitivity of silicon materials to temperature changes, the temperature-induced wavelength drift of a micro-loop modulator can make the operation of the optical modulator unstable. For carrier-depletion micro-loop modulators, the improvement of the modulation efficiency can be achieved by increasing the doping concentration of silicon, but it will increase the absorption loss of light in the waveguide and lead to a low extinction ratio.

On this basis, embodiments of the present disclosure provide an optical modulator and a control method therefor, which are capable of performing two successive resonance adjustments on optical signals by an adjustable ring-shaped resonant cavity, so as to improve the extinction ratio of optical signals.

Referring to FIG. 1, an optical modulator comprises: an input waveguide 100 configured to receive an initial optical signal; an adjustable ring-shaped resonant cavity 300, where the adjustable ring-shaped resonant cavity is coupled to the input waveguide 100 and configured to perform resonance and modulation processing on the initial optical signal and output a first optical signal; a feedback loop waveguide 200 coupled to the adjustable ring-shaped resonant cavity 300 and configured to receive and transmit the first optical signal; a first mode converter 400, where the first mode converter 400 is coupled to the feedback loop waveguide 200, and the first mode converter 400 is configured to perform mode conversion processing on the first optical signal and output a second optical signal; the adjustable ring-shaped resonant cavity 300 being further configured to perform resonance and modulation processing on the second optical signal and output a third optical signal; and an output waveguide 501, where the output waveguide 501 is coupled to the adjustable ring-shaped resonant cavity 300 and configured to receive and output the third optical signal.

The initial optical signal is received and transmitted to the ring-shaped resonant cavity 300 by the input waveguide 100, and the initial optical signal is resonated in the ring-shaped resonant cavity 300. Since the initial optical signal is a continuous optical signal, after the ring-shaped resonant cavity 300 performs resonance processing on the initial optical signal, the amplitude of the optical signal of a specific frequency is amplified and the first optical signal is generated. The first optical signal is transmitted to the first mode converter 400 by the feedback loop waveguide 200, and the first mode converter 400 performs mode conversion processing on the first optical signal and outputs the second optical signal. The second optical signal is coupled into the adjustable ring-shaped resonant cavity 300 again, and resonance processing is performed to amplify the amplitude of an optical signal of a specific frequency in the second optical signal to produce the third optical signal, and the third optical signal is output by the output waveguide 501 coupled to the adjustable ring-shaped resonant cavity 300. That is, by multiplexing the ring-shaped resonant cavity 300 to perform resonance processing on the initial optical signal and the second optical signal and amplifying the amplitude of an optical signal of a specific frequency, the third optical signal with a higher extinction ratio is obtained. That is, by means of mode multiplexing of the adjustable ring-shaped resonant cavity, optical signals of multiple modes can be modulated simultaneously, thereby improving the extinction ratio of the optical signals.

In an embodiment, the first mode converter 400 may convert the first optical signal into an optical signal of a different orthogonal mode or an optical signal of a different order mode. Since the second optical signal and the initial optical signal are optical signals of different modes and the ring-shaped resonant cavity 300 can support transmission of optical signals of multiple modes, when the second optical signal and the initial optical signal are transmitted in the ring-shaped resonant cavity 300, they are transmitted separately and no interference or crosstalk is generated. The ring-shaped resonant cavity 300 may be a circular micro-ring-shaped resonant cavity or a runway-type micro-ring-shaped resonant cavity, and the curved waveguide of the micro-ring-shaped resonant cavity supports the transmission of more than two modes in the micro-ring-shaped resonant cavity.

In addition, the effective refractive index in the cavity of the ring-shaped resonant cavity 300 is adjusted by the first photoelectronic modulation module and the second photoelectronic modulation module, so that when an optical signal is transmitted in the cavity, phase changes are accumulated and are converted into intensity changes through the interference effect, so as to modulate the resonant wavelength of the optical signal in the cavity.

In some embodiments, the optical modulator further includes: a second mode converter 500, where an input end of the second mode converter 500 is coupled to the output waveguide 501 and configured to perform mode conversion processing on the third optical signal and output a fourth optical signal, so that the output signal of the optical modulator is an optical signal of a target mode.

In some embodiments, the initial optical signal, the first optical signal, and the fourth optical signal are optical signals of a first mode, and the second optical signal and the third optical signal are optical signals of a second mode.

Resonance and modulation processing is performed on the initial optical signal of the first mode by the adjustable ring-shaped resonant cavity to generate the first optical signal of the first mode; mode conversion processing is performed on the first optical signal of the first mode by the first mode converter 400 to generate the second optical signal of the second mode; resonance and modulation processing is performed on the second optical signal of the second mode by the adjustable ring-shaped resonant cavity to generate the third optical signal of the second mode; and mode conversion processing is performed on the third optical signal of the second mode by the second mode converter 500 to generate the fourth optical signal of the first mode.

It should be noted that the first mode and the second mode may be any optical mode. Hereinafter, an example in which the first mode is a TE0 mode and the second mode is a TE1 mode or a TM0 mode will be taken for illustration.

In some embodiments, the first mode converter 400 and the second mode converter 500 are the same mode converters that are reversely arranged. The initial optical signal and the first optical signal are optical signals of the TE0 mode. The first mode converter 400 performs mode conversion of the first optical signal and outputs the second optical signal of the TE1 mode or TM0 mode, and the adjustable ring-shaped resonant cavity 300 performs resonance processing on the second optical signal to generate the third optical signal. The input end of the second mode converter 500 is coupled to the output waveguide 501, so as to perform mode conversion processing on the third optical signal and output the fourth optical signal. Specifically, the third optical signal is an optical signal of the TE1 mode or TM0 mode, and the fourth optical signal is an optical signal of the TE0 mode. The first mode converter 400 and the second mode converter 500 are configured such that the initial optical signal and the fourth optical signal have the same mode. That is, the output signal of the optical modulator has the same mode as the input signal.

In addition, during the transmission of the third optical signal of the TE1 mode or TM0 mode to the first mode converter 400 via the feedback loop waveguide 200, the third optical signal is subject to loss to ensure that the input signal to the first mode converter 400 is the first optical signal; and during the transmission of the first optical signal of the TE0 mode to the second mode converter 500 via the output waveguide 501, the first optical signal is subject to optical loss to ensure that the output signal of the second mode converter 500 is the fourth optical signal. By providing in the feedback loop waveguide 200 a single-mode waveguide supporting only the transmission of the TE0 mode, the third optical signal of the TE1 mode or TM0 mode is gradually lost during the transmission.

In some embodiments, the adjustable ring-shaped resonant cavity comprises a first coupling region and a second coupling region; the adjustable ring-shaped resonant cavity is coupled to the input waveguide 100 via the first coupling region, and the adjustable ring-shaped resonant cavity is coupled to the feedback loop waveguide 200 via the first coupling region; the first mode converter 400 is coupled to the adjustable ring-shaped resonant cavity via the second coupling region, and the adjustable ring-shaped resonant cavity is coupled to the output waveguide 501 via the second coupling region.

By being coupled to the input waveguide 100 and connected to the feedback loop waveguide 200 via the first coupling region, the initial optical signal can be input from the input waveguide 100 into the ring-shaped resonant cavity 300, and the first optical signal can be input from the ring-shaped resonant cavity 300 into the feedback loop waveguide 200; and by being coupled to the output waveguide 501 via the second coupling region, the second optical signal can be input from the output waveguide 501 into the ring-shaped resonant cavity 300, and the fourth optical signal can be input from the ring-shaped resonant cavity 300 into the output waveguide 501.

In some embodiments, the first mode converter 400 and the second mode converter 500 each include: a silicon substrate layer; a silicon oxide lower cladding provided on one side of the silicon substrate layer; a silicon waveguide layer provided on the side of the silicon oxide lower cladding away from the silicon substrate layer; and a silicon oxide upper cladding provided on the side of the silicon waveguide layer away from the silicon oxide lower cladding.

The adjustable ring-shaped resonant cavity further includes: a first photoelectronic modulation module, a second photoelectronic modulation module, and a ring-shaped resonant cavity 300, where the first photoelectronic modulation module is configured to adjust the refractive index of a first region of the ring-shaped resonant cavity 300; and the second photoelectronic modulation module is configured to adjust the refractive index of a second region of the ring-shaped resonant cavity 300. The ring-shaped resonant cavity 300 includes: a first straight waveguide 303, a second straight waveguide 304, a first half-ring waveguide 301, and a second half-ring waveguide 302, where the first half-ring waveguide 301 is connected to one end of the first straight waveguide 303 and one end of the second straight waveguide 304 separately, and the second half-ring waveguide 302 is connected to the other end of the first straight waveguide 303 and the other end of the second straight waveguide 304 separately, so as to form a ring waveguide.

In some embodiments, the first photoelectronic modulation module and the second photoelectronic modulation module adjust the refractive indexes of different regions of the ring-shaped resonant cavity 300, respectively. The refractive indexes of the first region and the second region are adjusted so that the initial optical signal and the second optical signal accumulate phase changes during transmission in the first region and the second region and interfere in the first straight waveguide 303 and the second straight waveguide 304 in the ring-shaped resonant cavity 300, respectively, so as to convert the phase changes into intensity changes.

In some embodiments, the first straight waveguide 303 and the second straight waveguide 304 are the first coupling region and the second coupling region, respectively; and the first half-ring waveguide 301 and the second half-ring waveguide 302 are the first region and the second region of the ring-shaped resonant cavity 300, respectively.

In some embodiments, by increasing the number of photoelectronic modulation modules to modulate the effective refractive indexes of multiple regions within the ring-shaped resonant cavity 300 in a synchronized manner, the phase change of the optical signal within the cavity of the ring-shaped resonant cavity 300 is modulated. Further, by configuring the ring photoelectronic modulation modules, the effective refractive indexes of all regions of the resonant cavity are modulated in a synchronized manner.

In some embodiments, the first region may be the first half-ring waveguide 301 and the second region may be the second half-ring waveguide 302.

Figure 2A:
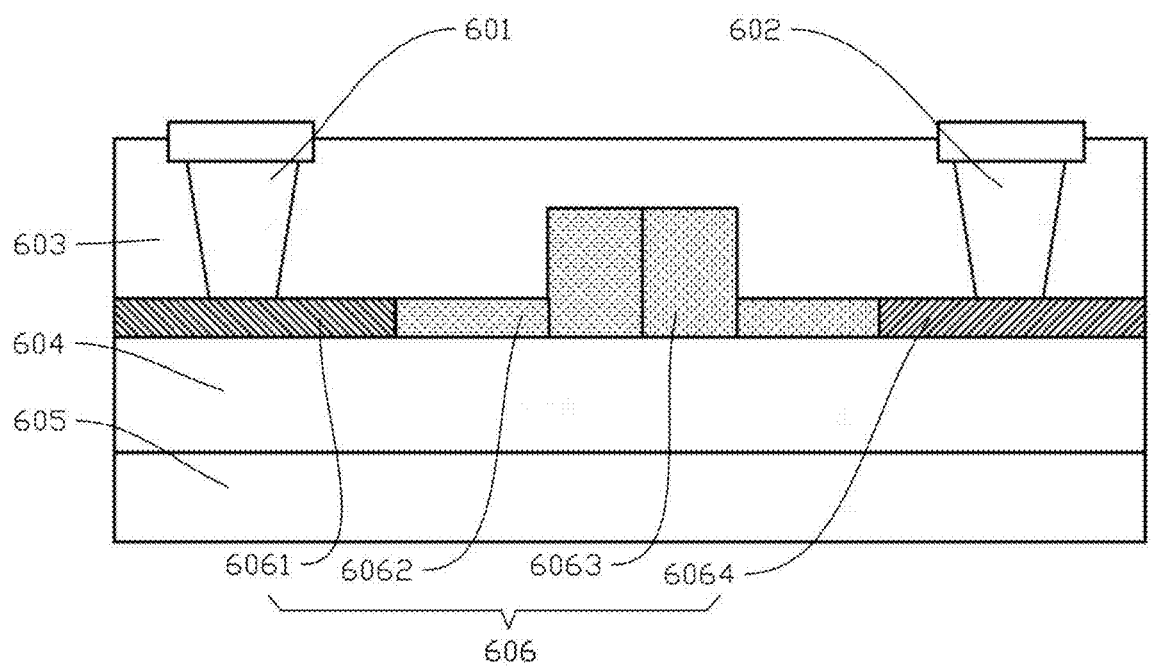
FIG. 2A is a cross-sectional schematic diagram of a silicon-based photoelectronic modulation module in an embodiment of the present disclosure.

Referring to FIG. 2A, the first photoelectronic modulation module and the second photoelectronic modulation module are both silicon-based photoelectronic modulation modules; and the silicon-based photoelectronic modulation modules each include the following regions that are arranged in sequence: a first P-type heavily doped region 6061, a first N-type heavily doped region 6064, a first P-type lightly doped region 6062, and a first N-type lightly doped region 6063, where the first P-type lightly doped region 6062 is provided on one side of the first P-type heavily doped region 6061; the first N-type lightly doped region 6063 is provided on the side of the first P-type lightly doped region 6062 away from the first P-type heavily doped region 6061; and the first N-type heavily doped region 6064 is provided on the side of the first N-type lightly doped region 6063 away from the first P-type lightly doped region 6062.

In some embodiments, the ring-shaped resonant cavity 300 is a ridge waveguide, the first region of the ring-shaped resonant cavity 300 is constituted by one first P-type lightly doped region 6062 and one first N-type lightly doped region 6063, and one first P-type lightly doped region 6062 and one first N-type lightly doped region 6063 may constitute a ridge waveguide. The first P-type heavily doped region 6061 and the first N-type heavily doped region 6064 are both planar waveguides, and the first P-type heavily doped region 6061 is electrically connected to the first P-type lightly doped region 6062, and the first N-type heavily doped region 6064 is electrically connected to the first N-type lightly doped region 6063 so that the planar waveguide is electrically connected to the ridge waveguide to constitute the first photoelectronic modulation module, and a depletion region is formed around the junction interface of the first P-type lightly doped region 6062 with the first N-type lightly doped region 6063. Specifically, the ridge waveguide and the first half-ring waveguide 301 may be of the same structure and may be multiplexed to implement resonance and modulation processing of optical signals within the cavity of the adjustable ring-shaped resonant cavity.

In addition, the second region of the adjustable ring-shaped resonant cavity 300 is constituted by one first P-type lightly doped region 6062 and one first N-type lightly doped region 6063, and one first P-type lightly doped region 6062 and one first N-type lightly doped region 6063 may constitute a ridge waveguide. The first P-type heavily doped region 6061 and the first N-type heavily doped region 6064 are both planar waveguides, and the first P-type heavily doped region 6061 is electrically connected to the first P-type lightly doped region 6062, and the first N-type heavily doped region 6064 is electrically connected to the first N-type lightly doped region 6063 so that the planar waveguide is electrically connected to the ridge waveguide to constitute the second photoelectronic modulation module, and a depletion region is formed around the junction interface of the first P-type lightly doped region 6062 with the first N-type lightly doped region 6063. Specifically, the ridge waveguide and the second half-ring waveguide 302 may be of the same structure and may be multiplexed to implement resonance and modulation processing of optical signals within the cavity of the adjustable ring-shaped resonant cavity 300.

In this embodiment, the first P-type heavily doped region 6061, the first N-type heavily doped region 6064, the first P-type lightly doped region 6062, and the first N-type lightly doped region 6063 are provided in the same layer to form a silicon waveguide layer 606. The first photoelectronic modulation module and the second photoelectronic modulation module further include: an upper cladding 603 provided on the upper surface of the silicon waveguide layer 606; a lower cladding provided on the lower surface 604 of the silicon waveguide layer 606; and a substrate layer provided on the side of the lower cladding away from the silicon waveguide layer 606, where the substrate layer is a silicon substrate layer 605, and the upper cladding 603 and the lower cladding are silicon dioxide claddings.

In addition, the upper cladding 603 is provided with several first electrodes 601 and several second electrodes 602 on the side away from the silicon waveguide layer 606, and the several first electrodes 601 and the several second electrodes 602 are distributed in a semi-ring shape. The upper cladding 603 is provided with a first metal via 6011 and a second metal via 6021. Through the first metal via 6011 and the second metal via 6021, the first P-type heavily doped region 6061 and the first N-type heavily doped region 6064 are connected to the first electrode 601 and the second electrode 602, respectively. The first electrode 601 and the second electrode 602 are electrically connected to an external electrical signal source, so that electrical modulation signals are applied to the first P-type heavily doped region 6061 and the first N-type heavily doped region 6064, thereby adjusting the concentration of carriers in the first P-type lightly doped region 6062 and the first N-type lightly doped region 6063, and further changing the effective refractive index of the transmission of optical modes in the waveguide. The ridge waveguide of the micro-ring-shaped resonant cavity supports transmission of multiple modes, where the main material of the waveguide layer is silicon with a total thickness of 340 nm, the ridge height of the ridge waveguide is 290 nm, the width of the ridge waveguide is 500 nm, and the height of the flat-plate waveguide is 50 nm.

In some embodiments, the specific parameters (e.g., the waveguide thickness, ridge height, and width) in the waveguide layer may be adaptively adjusted according to the specific modulation requirements.

Figure 2B:
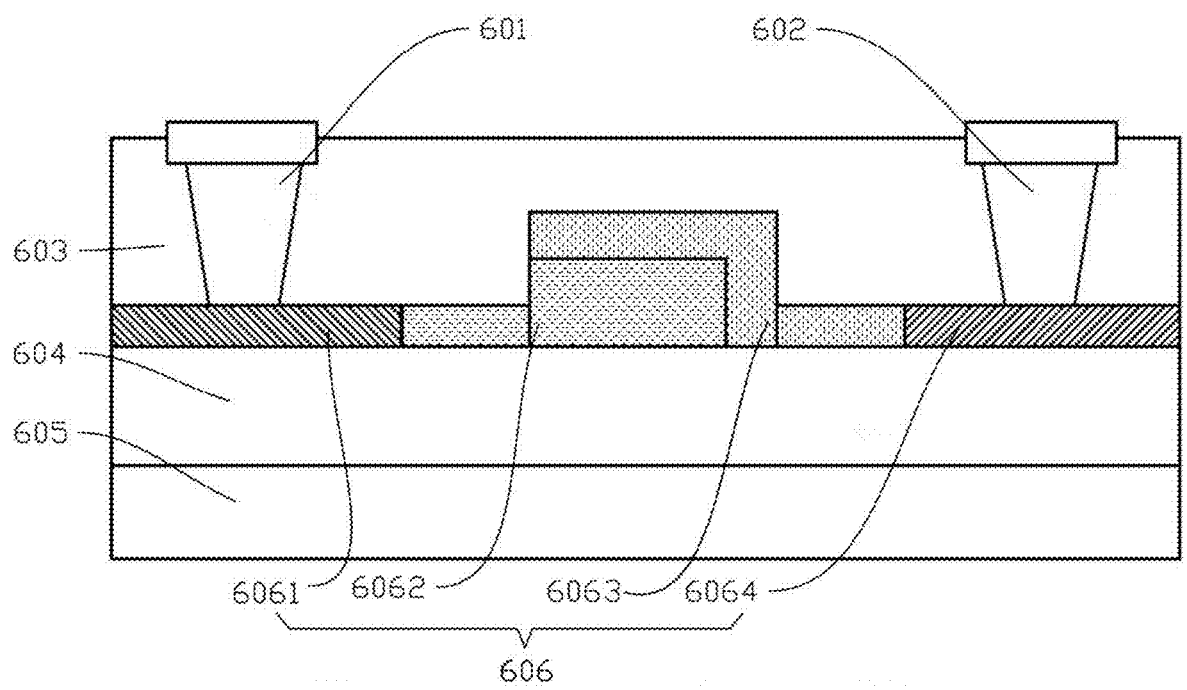
FIG. 2B is a cross-sectional schematic diagram of a silicon-based photoelectronic modulation module in another embodiment of the present disclosure.

Referring to FIG. 2B, as shown in FIG. 2B, in some embodiments, the first P-type lightly doped region 6062 includes at least two surfaces, and the first N-type lightly doped region 6063 covers the at least two surfaces of the first P-type lightly doped region 6062; or the first N-type lightly doped region 6063 includes at least two surfaces, and the first P-type lightly doped region 6062 covers the at least two surfaces of the N-type lightly doped region 6063.

In some embodiments, the first N-type lightly doped region 6063 covers at least two surfaces of the first P-type lightly doped region 6062 to form an L-type PN junction doped structure. By making the first N-type lightly doped region 6063 cover the at least two surfaces of the first P-type lightly doped region 6062, the overlapping area between the optical signal mode field and the depletion region can be increased, thus effectively improving the modulation efficiency of the first photoelectronic modulation module, and by adopting the L-type PN junction doped structure, the variation range of the refractive index of the region modulated in the ring-shaped resonant cavity 300 can be increased.

In some embodiments, the first P-type lightly doped region 6062 covers at least two surfaces of the first N-type lightly doped region 6063 to form an L-type PN junction doped structure. By making the first P-type lightly doped region 6062 cover the at least two surfaces of the first N-type lightly doped region 6063, the overlapping area between the optical signal mode field and the depletion region can be increased, thus effectively improving the modulation efficiency of the first photoelectronic modulation module, and by adopting the L-type PN junction doped structure, the variation range of the refractive index of the region modulated in the ring-shaped resonant cavity 300 can be increased.

Referring again to FIG. 1, the input waveguide 100 includes: a single-mode input waveguide 101, a first tapered waveguide 102, and a multi-mode input waveguide 103.

One end of the first tapered waveguide 102 is connected to the multi-mode input waveguide 103, and the other end of the first tapered waveguide 102 is connected to the single-mode input waveguide 101. The initial optical signal is received by the single-mode input waveguide 101, and transmitted to the multi-mode input waveguide 103 via the first tapered waveguide 102. Through coupling of the multi-mode input waveguide 103 with the adjustable ring-shaped resonant cavity 300, the initial optical signal is transmitted to the adjustable ring-shaped resonant cavity 300, so as to perform resonance processing on the initial optical signal and generate the first optical signal.

The feedback loop waveguide 200 includes: a feedback multi-mode waveguide 201, an arc-shaped waveguide 202, and a second tapered waveguide 203, where one end of the feedback multi-mode waveguide 201 is connected to the multi-mode input waveguide 103, and the other end of the feedback multi-mode waveguide 201 is connected to one end of the second tapered waveguide 203; the other end of the second tapered waveguide 203 is connected to one end of the arc-shaped waveguide 202; and the other end of the arc-shaped waveguide 202 is connected to the first mode converter 400. Specifically, the first optical signal is received by coupling the feedback multi-mode waveguide 201 to the adjustable ring-shaped resonant cavity, and is incident into the arc-shaped waveguide 202 via the second tapered waveguide 203. The first optical signal is incident into the first mode converter 400 via the arc-shaped waveguide 202.

In some embodiments, the arc-shaped waveguide 202 includes: a silicon substrate layer 605; a silicon oxide lower cladding provided on one side of the silicon substrate layer 605; a silicon waveguide layer 606 provided on the side of the silicon oxide lower cladding away from the silicon substrate layer 605; and a silicon oxide upper cladding 603 provided on the side of the silicon waveguide layer 606 away from the silicon oxide lower cladding.

In some embodiments, the feedback multi-mode waveguide 201 and the multi-mode input waveguide 103 may be of an integral structure, and by multiplexing the same multi-mode waveguide, the output function for the initial optical signal and the output function for the first optical signal can be achieved.

The arc-shaped waveguide 202 includes: a silicon substrate layer; a silicon oxide lower cladding provided on one side of the silicon substrate layer; a silicon waveguide layer provided on the side of the silicon oxide lower cladding away from the silicon substrate layer; and a silicon oxide upper cladding provided on the side of the silicon waveguide layer away from the silicon oxide lower cladding. Specifically, the arc-shaped waveguide 202 is a single-mode waveguide, which only supports the transmission of optical signals of the TE0 mode. Therefore, optical signals of other modes will suffer optical loss during the transmission in the arc-shaped waveguide 202, so that the input signal to the first mode converter 400 is only an optical signal of the TE0 mode.

The silicon waveguide layer 606 is provided with a ridge waveguide or a strip waveguide. In a case where the waveguide provided in the silicon waveguide layer 606 is a strip waveguide, a transition waveguide is provided between the arc-shaped waveguide 202 and the first mode converter 400 to perform matching of optical signals. Specifically, the transition waveguide may be a tapered waveguide with a linear transition from a ridge waveguide to a strip waveguide.

Figure 3A:
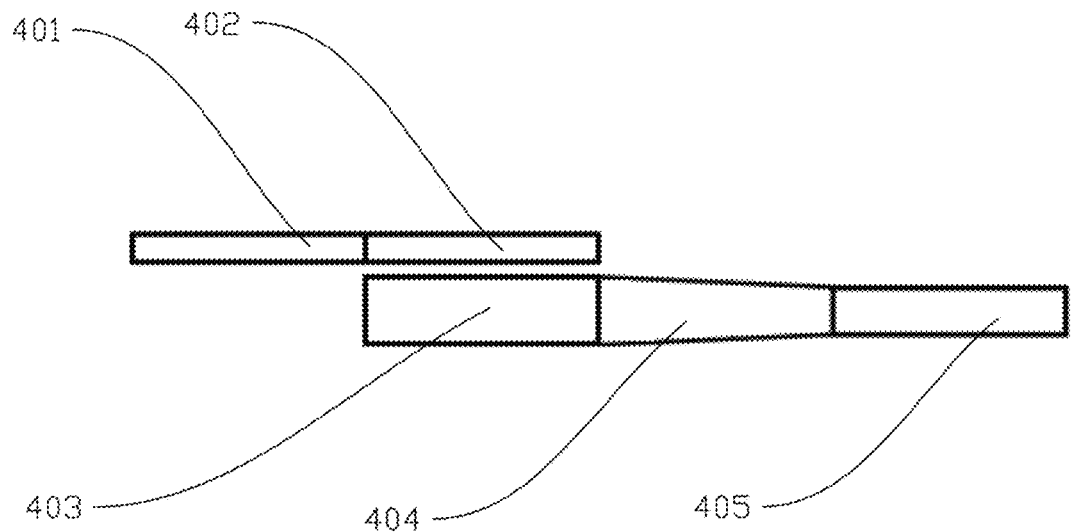
FIG. 3A is a schematic diagram of a first/second mode converter in an embodiment of the present disclosure.

Referring to FIGS. 1 and 3A, in some embodiments, the first mode converter 400 includes: a first input single-mode waveguide 401, where one end of the first input single-mode waveguide 401 is connected to the feedback loop waveguide 200; a first single-mode coupling waveguide 402, where one end of the first single-mode coupling waveguide 402 is connected to the other end of the first input single-mode waveguide 401; a first multi-mode coupling waveguide 403 coupled to the first single-mode coupling waveguide 402; a first conversion tapered waveguide 404, where one end of the first conversion tapered waveguide 404 is connected to the first multi-mode coupling waveguide 403; and a first output multi-mode waveguide 405, where one end of the first output multi-mode waveguide 405 is connected to the other end of the first conversion tapered waveguide 404, and the other end of the first output multi-mode waveguide 405 is connected to the output waveguide 501.

In some embodiments, the first output multi-mode waveguide 405 and the output waveguide 501 may be of an integral structure, and by multiplexing the same multi-mode waveguide, the output function for the second optical signal and the output function for the third optical signal can be achieved.

In some embodiments, the first single-mode coupling waveguide 402 is coupled to the first multi-mode coupling waveguide 403 and satisfies the phase matching condition, so that the first optical signal is transmitted into the first single-mode coupling waveguide 402 via the first input single-mode waveguide 401, and then after transmission for a certain coupling length, the first optical signal is coupled into the first multi-mode coupling waveguide 403, and converted into an optical signal of other modes and transmitted to the first conversion tapered waveguide 404. The first conversion tapered waveguide 404 performs mode conversion processing on the first optical signal of other modes and outputs the second optical signal, which is coupled into the adjustable ring-shaped resonant cavity via the first output multi-mode waveguide 405, and then the adjustable ring-shaped resonant cavity 300 performs resonance processing on the second optical signal to generate the third optical signal.

For example, the first optical signal is of the TE0 mode, and after coupling and transmission via the first multi-mode coupling waveguide 403 and the first single-mode coupling waveguide 402, an optical signal of the TE1 mode is generated. The optical signal of the TE1 mode is transmitted in the first conversion tapered waveguide 404 and gradually converted to the second optical signal of the TM0 mode, and the second optical signal of the TM0 mode is coupled into the adjustable ring-shaped resonant cavity 300 via the first output multi-mode waveguide 405.

Figure 3B:
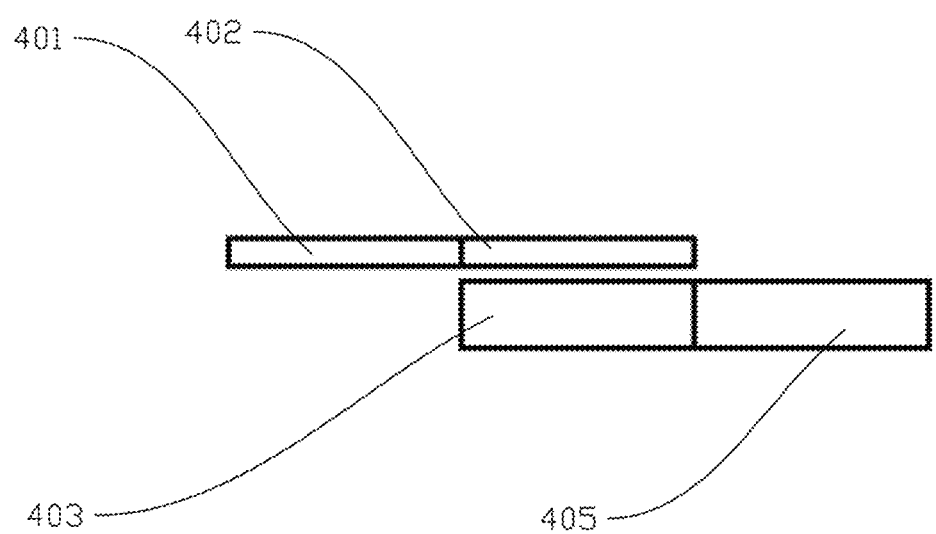
FIG. 3B is a schematic diagram of a first/second mode converter in another embodiment of the present disclosure.

Referring to FIG. 3B, in some embodiments, the first mode converter 400 includes: a first input single-mode waveguide 401, where one end of the first input single-mode waveguide 401 is connected to the feedback loop waveguide 200; a first single-mode coupling waveguide 402, where one end of the first single-mode coupling waveguide 402 is connected to the other end of the first input single-mode waveguide 401; a first multi-mode coupling waveguide 403 coupled to the first single-mode coupling waveguide 402; a first output multi-mode waveguide 405, where one end of the first output multi-mode waveguide 405 is connected to one end of the first multi-mode coupling waveguide 403, and the other end of the first output multi-mode waveguide 405 is connected to the output waveguide 501.

In some embodiments, the first single-mode coupling waveguide 402 is coupled to the first multi-mode coupling waveguide 403 and satisfies the phase matching condition, so that the first optical signal is transmitted into the first single-mode coupling waveguide 402 via the first input single-mode waveguide 401, and then after transmission for a certain coupling length, the first optical signal is coupled into the first multi-mode coupling waveguide 403, and converted into the second optical signal of other modes and transmitted to the first output multi-mode waveguide 405; and the second optical signal is coupled into the adjustable ring-shaped resonant cavity 300 via the first output multi-mode waveguide 405, and then the adjustable ring-shaped resonant cavity 300 performs resonance processing on the second optical signal to generate the third optical signal.

For example, the first optical signal is of the TE0 mode, and after coupling and transmission via the first multi-mode coupling waveguide 403 and the first single-mode coupling waveguide 402, the second optical signal of the TE1 mode is generated, and the second optical signal of the TE1 mode is coupled into the adjustable ring-shaped resonant cavity 300 via the first output multi-mode waveguide 405.

In some embodiments, the second mode converter 500 includes: a second input multi-mode waveguide, where one end of the second input multi-mode waveguide is connected to the output waveguide; a second conversion tapered waveguide, where one end of the second conversion tapered waveguide is connected to the other end of the second input multi-mode waveguide; a second multi-mode coupling waveguide, where one end of the second multi-mode coupling waveguide is connected to the other end of the second conversion tapered waveguide; a second single-mode coupling waveguide, where the second single-mode coupling waveguide is coupled to the second multi-mode coupling waveguide; and a second output single-mode waveguide, where one end of the second output single-mode waveguide is connected to one end of the second single-mode coupling waveguide.

In some embodiments, the second single-mode coupling waveguide is coupled to the second multi-mode coupling waveguide and satisfies the phase matching condition, so that the third optical signal is transmitted to the second conversion tapered waveguide via the second input multi-mode waveguide, and then after transmission in the second conversion tapered waveguide for a certain distance, is converted to an optical signal of other modes and then transmitted to the second multi-mode coupling waveguide, and after transmission for the certain coupling length, the optical signal of other modes is coupled to the second single-mode coupling waveguide and converted to a fourth optical signal.

For example, the third optical signal is an optical signal of the TM0 mode that is transmitted in the second conversion tapered waveguide and gradually converted into the TE1 mode; and the optical signal of the TE1 mode is coupled and transmitted via the second multi-mode coupling waveguide and the second single-mode coupling waveguide and then an optical signal of the TE0 mode is generated in the second single-mode coupling waveguide.

In some embodiments, the second mode converter 500 includes: a second input multi-mode waveguide, where one end of the second input multi-mode waveguide is connected to the output waveguide; a second multi-mode coupling waveguide, where one end of the second multi-mode coupling waveguide is connected to the other end of the second input multi-mode waveguide; a second single-mode coupling waveguide, where the second single-mode coupling waveguide is connected to the second multi-mode coupling waveguide; and a second output single-mode waveguide, where one end of the second output single-mode waveguide is connected to one end of the second single-mode coupling waveguide.

In some specific embodiments, the second single-mode coupling waveguide is coupled to the second multi-mode coupling waveguide and satisfies the phase matching condition, so that the third optical signal is transmitted to the second multi-mode coupling waveguide via the second input multi-mode waveguide, and then after transmission for a certain coupling length, the third optical signal is coupled to the second single-mode coupling waveguide and is converted to a fourth optical signal of other modes.

For example, the third optical signal is an optical signal of the TE1 mode. The optical signal of the TE1 mode is coupled and transmitted via the second multi-mode coupling waveguide and the second single-mode coupling waveguide and then an optical signal of the TE0 mode is generated in the second single-mode coupling waveguide.

Referring together to FIG. 1, FIG. 2A, and FIG. 3A, in a specific embodiment, an optical modulator includes: an input waveguide 100 configured to receive an initial optical signal; an adjustable ring-shaped resonant cavity, where the adjustable ring-shaped resonant cavity is coupled to the input waveguide 100 and configured to perform resonance processing on the initial optical signal and output a first optical signal; a feedback loop waveguide 200 coupled to the adjustable ring-shaped resonant cavity and configured to receive and transmit the first optical signal; a first mode converter 400, where the first mode converter 400 is coupled to the feedback loop waveguide 200, and the first mode converter 400 is configured to perform mode conversion processing on the first optical signal and output a second optical signal; the adjustable ring-shaped resonant cavity being further configured to perform resonance processing on the second optical signal and output a third optical signal; an output waveguide 501, where the output waveguide 501 is coupled to the adjustable ring-shaped resonant cavity and configured to receive and output the third optical signal; and a second mode converter 500, where an input end of the second mode converter 500 is coupled to the output waveguide 501 and is configured to perform mode conversion processing on the third optical signal and output a fourth optical signal, so that the output signal is an optical signal of a target mode. By means of mode multiplexing of the adjustable ring-shaped resonant cavity, optical signals of multiple modes can be modulated simultaneously, thereby improving the extinction ratio of the optical signals.

In some embodiments, the first mode converter 400 and the second mode converter 500 are the same mode converters that are reversely arranged.

The adjustable ring-shaped resonant cavity includes: a first photoelectronic modulation module, a second photoelectronic modulation module, and a ring-shaped resonant cavity 300, where the first photoelectronic modulation module is configured to adjust the refractive index of a first region of the ring-shaped resonant cavity 300; and the second photoelectronic modulation module is configured to adjust the refractive index of a second region of the ring-shaped resonant cavity 300.

The first photoelectronic modulation module and the second photoelectronic modulation module are both silicon-based photoelectronic modulation modules. The silicon-based photoelectronic modulation modules each include: a first P-type heavily doped region 6061, a first N-type heavily doped region 6064, a first P-type lightly doped region 6062, and a first N-type lightly doped region 6063, where the first P-type lightly doped region 6062 is provided on one side of the first P-type heavily doped region 6061; the first N-type lightly doped region 6063 is provided on the side of the first P-type lightly doped region 6062 away from the first P-type heavily doped region 6061; and the first N-type heavily doped region 6064 is provided on the side of the first N-type lightly doped region 6063 away from the first P-type lightly doped region 6062.

In some embodiments, the adjustable ring-shaped resonant cavity 300 is a ridge waveguide, the first region and the second region of the adjustable ring-shaped resonant cavity 300 are each constituted by one first P-type lightly doped region 6062 and one first N-type lightly doped region 6063, and one first P-type lightly doped region 6062 and one first N-type lightly doped region 6063 may constitute a ridge waveguide. The first P-type heavily doped region 6061 and the first N-type heavily doped region 6064 are both planar waveguides, and the first P-type heavily doped region 6061 is electrically connected to the first P-type lightly doped region 6062, and the first N-type heavily doped region 6064 is electrically connected to the first N-type lightly doped region 6063 so that the planar waveguide is electrically connected to the ridge waveguide to constitute a PN junction type optical modulator, and a depletion region is formed around the junction interface of the first P-type lightly doped region 6062 with the first N-type lightly doped region 6063.

The first mode converter 400 includes: a first input single-mode waveguide 401, a first single-mode coupling waveguide 402, a first multi-mode coupling waveguide 403, a first conversion tapered waveguide 404, and a first output multi-mode waveguide 405, where one end of the first input single-mode waveguide 401 is connected to the feedback loop waveguide 200, and the other end of the first input single-mode waveguide 401 is connected to the first single-mode coupling waveguide 402; one end of the first conversion tapered waveguide 404 is connected to the first multi-mode coupling waveguide 403, the other end of the first conversion tapered waveguide 404 is connected to one end of the first output multi-mode waveguide 405, and the other end of the first output multi-mode waveguide 405 is connected to the output waveguide 501, where the first single-mode coupling waveguide 402 is coupled to the first multi-mode coupling waveguide 403. The second mode converter 500 includes: a second input multi-mode waveguide, a second single-mode coupling waveguide, a second multi-mode coupling waveguide, a second conversion tapered waveguide, and a second output single-mode waveguide, where one end of the second input multi-mode waveguide is connected to the output waveguide 501 and the other end of the second input multi-mode waveguide is connected to one end of the second conversion tapered waveguide; the other end of the second conversion tapered waveguide is connected to the second multi-mode coupling waveguide; one end of the second single-mode coupling waveguide is connected to the second output single-mode waveguide, where the second single-mode coupling waveguide is coupled to the second multi-mode coupling waveguide.

The initial optical signal is a continuous optical signal of the TE0 mode. The initial optical signal is received by the single-mode input waveguide 101, and the initial optical signal is transmitted to the multi-mode input waveguide 103 via the first tapered waveguide 102. Through coupling of the multi-mode input waveguide 103 with the ring-shaped resonant cavity 300, the initial optical signal is transmitted to the ring-shaped resonant cavity 300, so as to perform resonance processing on the initial optical signal and generate the first optical signal. Specifically, the first optical signal is of the TE0 mode.

In some embodiments, electrical modulation signals are applied to the first P-type heavily doped region 6061 and the first N-type heavily doped region 6064 via several electrodes, thereby adjusting the concentration of carriers in the first P-type lightly doped region 6062 and the first N-type lightly doped region 6063, and further changing the effective refractive index of the transmission of optical modes in the waveguide. The first optical signal accumulates phase changes during transmission in the ring-shaped resonant cavity 300 and interferes in the first straight waveguide 303 and the second straight waveguide 304 of the ring-shaped resonant cavity 300 separately, so as to convert the phase changes into intensity changes, thereby modulating the resonant wavelength within the adjustable ring-shaped resonant cavity 300.

The first optical signal of the TE0 mode is converted into the second optical signal of the TM0 mode by the first mode converter 400 and the second optical signal of the TM0 mode is coupled into the ring-shaped resonant cavity 300 via the first output multi-mode waveguide 405; and the ring-shaped resonant cavity 300 performs resonance processing on the second optical signal and generates a third optical signal to obtain a third optical signal with a high extinction ratio. Specifically, the third optical signal is of the TM0 mode. By means of mode multiplexing of the adjustable ring-shaped resonant cavity, optical signals of multiple modes can be modulated simultaneously, thereby improving the extinction ratio of the optical signals.

The third optical signal of the TM0 mode is converted to the fourth optical signal of the TE0 mode by the second mode converter 500 to obtain an optical signal of the TE0 mode with a high extinction ratio.

Figure 4A:
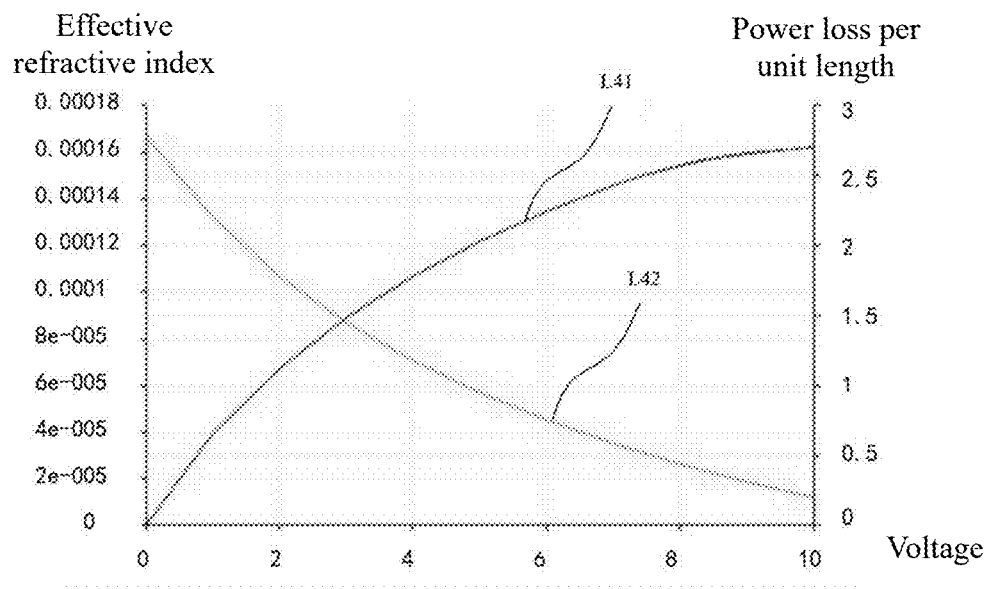
FIG. 4A is a schematic diagram of simulation of the modulation of a first optical signal of a TE0 mode provided in another embodiment of the present disclosure.
Figure 4B:
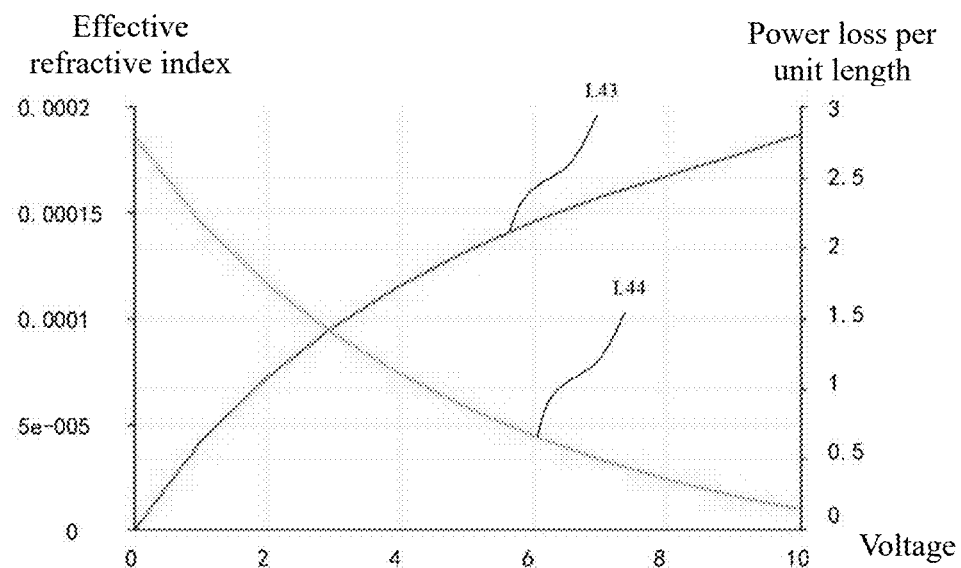
FIG. 4B is a schematic diagram of simulation of the modulation of a second optical signal of a TM0 mode provided in another embodiment of the present disclosure.

Referring to FIGS. 4A and 4B, the horizontal coordinates are the applied voltage value (the absolute voltage value in V) of the first photoelectronic modulation module and the second photoelectronic modulation module, respectively, and the left vertical coordinate is the effective refractive index, and the right vertical coordinate is the power loss per unit length (in dB/cm). L41 is the curve of relationship between the applied voltage value and the effective refractive index of the TE0 mode, L43 is the curve of relationship between the applied voltage value and the effective refractive index of the TM0 mode, L42 is the curve of relationship between the applied voltage value and the power loss per unit length (in dB/cm) of the TE0 mode, and L43 is the curve of relationship between the applied voltage value and the power loss per unit length of the TM0 mode.

As shown in FIG. 4A, as the applied voltage value of the first photoelectronic modulation module gradually increases, in the adjustable ring-shaped resonant cavity 300, the effective refractive index of the TE0 mode gradually increases, and the power loss per unit length becomes smaller; and as the applied voltage value of the second photoelectronic modulation module gradually increases, in the adjustable ring-shaped resonant cavity 300, the effective refractive index of the TM0 mode gradually increases, and the power loss per unit length becomes smaller.

By changing different voltage values applied to the first photoelectronic modulation module and the second photoelectronic modulation module to change the effective refractive indexes of the first region and the second region in the ring-shaped resonant cavity 300, optical signals of the TE0 mode and the TM0 mode accumulate phase changes in the ring-shaped resonant cavity 300. The optical signals of the TE0 mode and TM0 mode interfere in the first straight waveguide 303 and the second straight waveguide 304, respectively, so as to convert the phase changes into intensity changes, thereby changing the resonant wavelength within the adjustable ring-shaped resonant cavity 300.

Figure 5A:
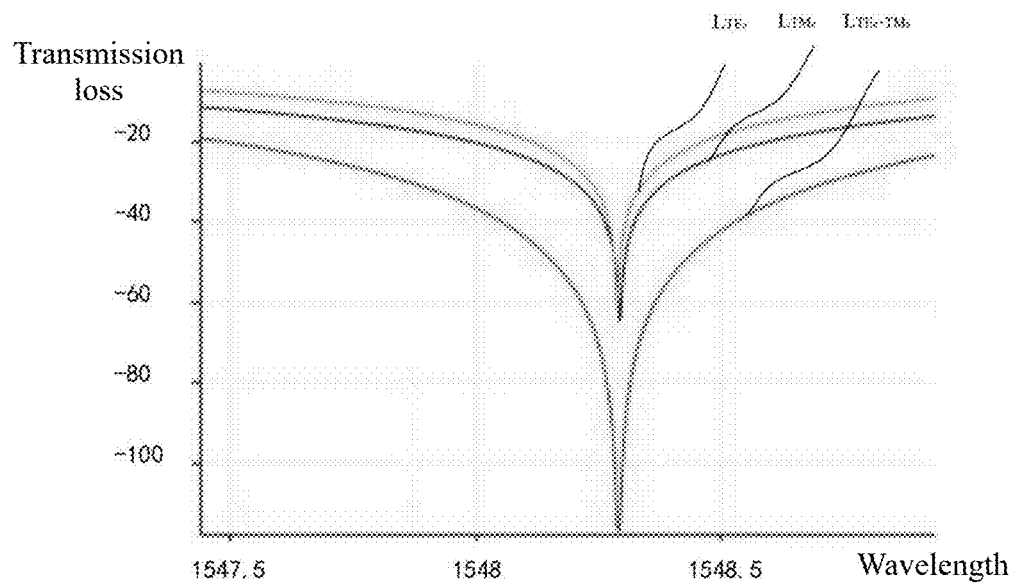
FIG. 5A is a schematic diagram of simulation of resonant spectra provided in another embodiment of the present disclosure.
Figure 5B:
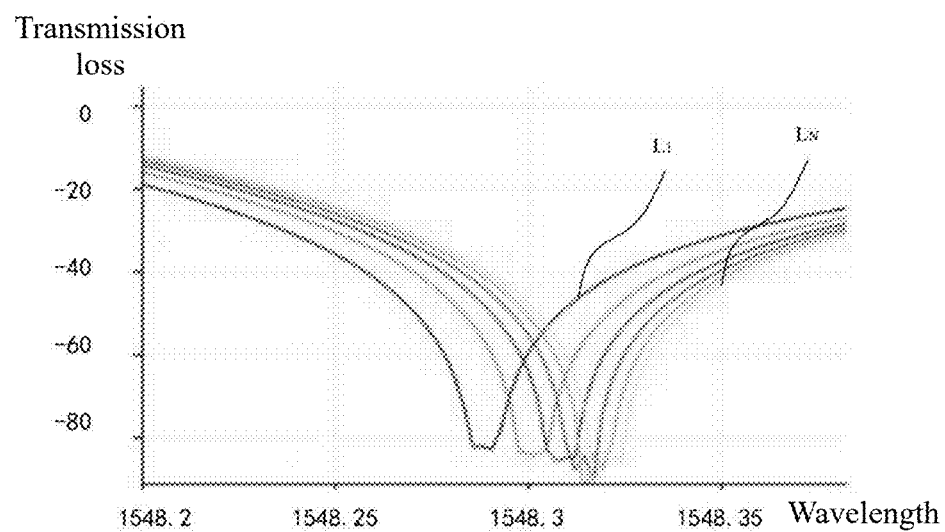
FIG. 5B is a schematic diagram of simulation of the drift of resonant spectra provided in another embodiment of the present disclosure.

Please refer to FIGS. 5A and 5B together, where the horizontal coordinates are wavelengths (in nm) and the vertical coordinates are signal power (in dB). LTE0 and LTM0 are curves of the resonant wavelengths of different modes, LTE0+TM0 is the total resonant spectrum, and L1 to LN are the curves of relationship between different applied voltages and resonant wavelengths.

As shown in FIG. 5A, the resonant wavelengths of the TE0 mode and the TM0 mode coincide exactly, so the first optical signal of the TE0 mode can be acquired by performing resonance processing on the initial wavelength of the TE0 mode, and the first optical signal of the TE0 mode is converted into the second optical signal of the TM0 mode by the first mode converter 400 and the second optical signal of the TM0 mode is coupled into the adjustable ring-shaped resonant cavity 300 via the first output multi-mode waveguide 405; and the adjustable ring-shaped resonant cavity 300 performs resonance processing on the second optical signal and generates a third optical signal to obtain a third optical signal with a high extinction ratio. That is, by performing resonance processing twice on optical signals, an optical signal with a high extinction ratio is obtained, and resonance processing is performed on optical signals of two different modes by the same adjustable ring-shaped resonant cavity 300.

As shown in FIG. 5B, by separately resonating the TE0 mode and the TM0 mode to obtain an optical signal with a high extinction ratio, in the spectrum of this optical signal, the resonant peak gradually drifts with the increase of the reverse voltage. Specifically, the applied reverse voltage on the curve corresponding to L1 is 0V, and the applied reverse voltage on the curve corresponding to LN is 10V. Specifically, the resonant wavelength gradually increases with the increase of the reverse voltage.

Referring together to FIG. 1, FIG. 2B, and FIG. 3B, in a specific embodiment, an optical modulator includes: an input waveguide 100 configured to receive an initial optical signal; an adjustable ring-shaped resonant cavity 300, where the adjustable ring-shaped resonant cavity 300 is coupled to the input waveguide 100 and configured to perform resonance processing on the initial optical signal and output a first optical signal; a feedback loop waveguide 200 coupled to the adjustable ring-shaped resonant cavity 300 and configured to receive and transmit the first optical signal; a first mode converter 400, where the first mode converter 400 is coupled to the feedback loop waveguide 200, and the first mode converter 400 is configured to perform mode conversion processing on the first optical signal and output a second optical signal; the adjustable ring-shaped resonant cavity 300 being further configured to perform resonance processing on the second optical signal and output a third optical signal; an output waveguide 501, where the output waveguide 501 is coupled to the adjustable ring-shaped resonant cavity 300 and configured to receive and output the third optical signal; and a second mode converter 500, where an input end of the second mode converter 500 is coupled to the output waveguide 501 and is configured to perform mode conversion processing on the third optical signal and output a fourth optical signal, so that the output signal is an optical signal of a target mode.

In some embodiments, the first mode converter 400 and the second mode converter 500 are the same mode converters that are reversely arranged.

In some embodiments, he adjustable ring-shaped resonant cavity 300 is a ridge waveguide, the first region and the second region of the adjustable ring-shaped resonant cavity 300 are each constituted by one first P-type lightly doped region 6062 and one first N-type lightly doped region 6063, and one first P-type lightly doped region 6062 and one first N-type lightly doped region 6063 may constitute a ridge waveguide. The first P-type heavily doped region 6061 and the first N-type heavily doped region 6064 are both planar waveguides, and the first P-type heavily doped region 6061 is electrically connected to the first P-type lightly doped region 6062, and the first N-type heavily doped region 6064 is electrically connected to the first N-type lightly doped region 6063 so that the planar waveguide is electrically connected to the ridge waveguide to constitute a PN junction type optical modulator, and a depletion region is formed around the junction interface of the first P-type lightly doped region 6062 with the first N-type lightly doped region 6063.

The first mode converter 400 includes: a first input single-mode waveguide 401, a first single-mode coupling waveguide 402, a first multi-mode coupling waveguide 403, and a first output multi-mode waveguide 405, where one end of the first input single-mode waveguide 401 is connected to the feedback loop waveguide 200, and the other end of the first input single-mode waveguide 401 is connected to the first single-mode coupling waveguide 402; and one end of the first output multi-mode waveguide 405 is connected the first multi-mode coupling waveguide 403, and the other end of the first output multi-mode waveguide 405 is connected to the output waveguide 501, where the first single-mode coupling waveguide 402 is coupled to the first multi-mode coupling waveguide 403.

The second mode converter 500 includes: a second input multi-mode waveguide, a second single-mode coupling waveguide, a second multi-mode coupling waveguide, a second conversion tapered waveguide, and a second output single-mode waveguide, where one end of the second input multi-mode waveguide is connected to the output waveguide 501 and the other end of the second input multi-mode waveguide is connected to one end of the second conversion tapered waveguide; the other end of the second conversion tapered waveguide is connected to the second multi-mode coupling waveguide; and one end of the second single-mode coupling waveguide is connected to the second output single-mode waveguide, where the second single-mode coupling waveguide is coupled to the second multi-mode coupling waveguide.

The initial optical signal is a continuous optical signal of the TE0 mode. The initial optical signal is received by the single-mode input waveguide 101, and the initial optical signal is transmitted to the multi-mode input waveguide 103 via the first tapered waveguide 102. Through coupling of the multi-mode input waveguide 103 with the adjustable ring-shaped resonant cavity 300, the initial optical signal is transmitted to the adjustable ring-shaped resonant cavity 300, so as to perform resonance processing on the initial optical signal and generate the first optical signal. Specifically, the first optical signal is of the TE0 mode.

In some embodiments, electrical modulation signals are applied to the first P-type heavily doped region 6061 and the first N-type heavily doped region 6064 via several electrodes, thereby adjusting the concentration of carriers in the first P-type lightly doped region 6062 and the first N-type lightly doped region 6063, and further changing the effective refractive index of the transmission of optical modes in the waveguide. The first optical signal accumulates phase changes during transmission in the adjustable ring-shaped resonant cavity 300 and interferes in the first straight waveguide 303 and the second straight waveguide 304 of the adjustable ring-shaped resonant cavity 300 separately, so as to convert the phase changes into intensity changes, thereby modulating the resonant wavelength within the adjustable ring-shaped resonant cavity 300.

The first optical signal of the TE0 mode is converted into the second optical signal of the TE1 mode by the first mode converter 400, and the second optical signal of the TE1 mode is coupled into the adjustable ring-shaped resonant cavity 300 via the first output multi-mode waveguide 405; and the adjustable ring-shaped resonant cavity 300 performs resonance processing on the second optical signal and generates a third optical signal, so as to obtain a third optical signal with a high extinction ratio. Specifically, the third optical signal is of the TE1 mode.

The third optical signal of the TE1 mode is converted to the fourth optical signal of the TE0 mode by the second mode converter 500 to obtain an optical signal of the TE0 mode with a high extinction ratio.

Figure 6A:
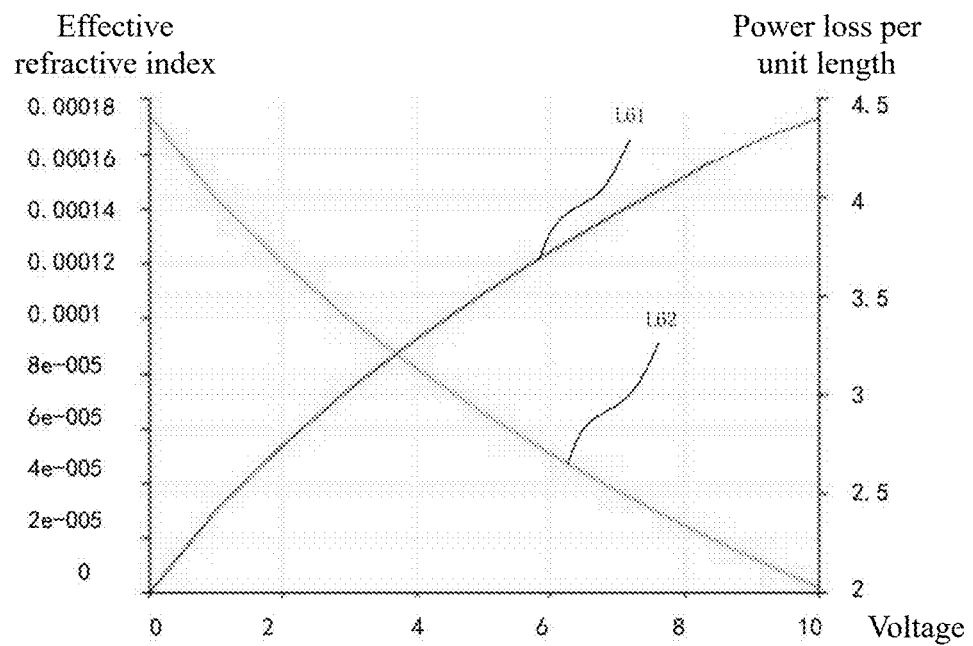
FIG. 6A is a schematic diagram of simulation of the modulation of a first optical signal of a TE0 mode provided in another embodiment of the present disclosure.
Figure 6B:
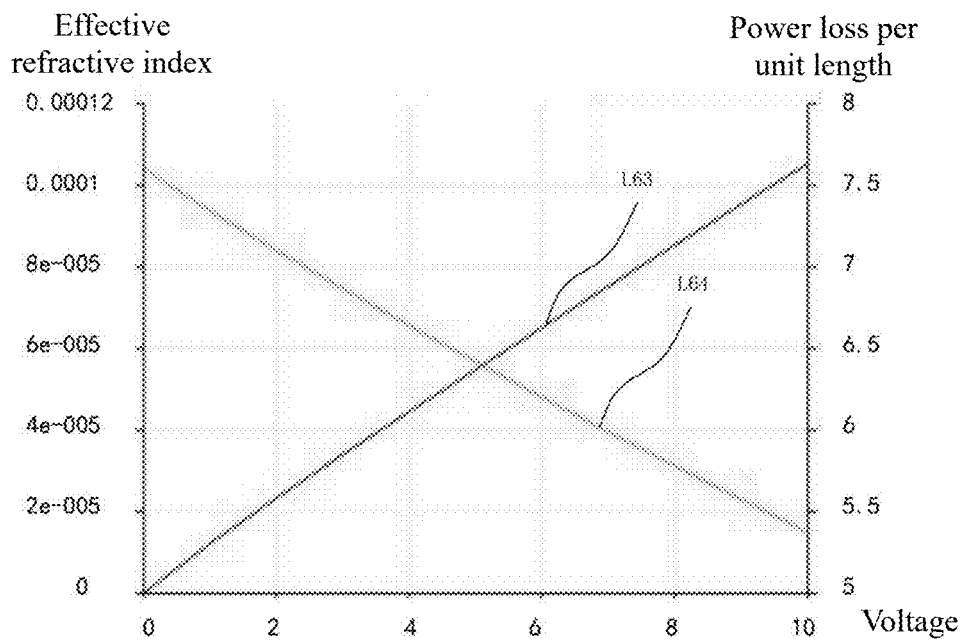
FIG. 6B is a schematic diagram of simulation of the modulation of a second optical signal of a TE1 mode provided in another embodiment of the present disclosure.

Referring to FIGS. 6A and 6B, the horizontal coordinates are the applied voltage value (the absolute voltage value in V) of the first photoelectronic modulation module and the second photoelectronic modulation module, respectively, and the left vertical coordinate is the effective refractive index, and the right vertical coordinate is the power loss per unit length (in dB/cm). L61 is the curve of relationship between the applied voltage value and the effective refractive index of the TE0 mode, L63 is the curve of relationship between the applied voltage value and the effective refractive index of the TE1 mode, L62 is the curve of relationship between the applied voltage value and the power loss per unit length of the TE0 mode, and L43 is the curve of relationship between the applied voltage value and the power loss per unit length of the TE1 mode.

As shown in FIG. 6A, as the applied voltage value of the first photoelectronic modulation module gradually increases, in the adjustable ring-shaped resonant cavity 300, the effective refractive index of the TE0 mode gradually increases, and the power loss per unit length becomes smaller; and as the applied voltage value of the second photoelectronic modulation module gradually increases, in the adjustable ring-shaped resonant cavity 300, the effective refractive index of the TE1 mode gradually increases, and the power loss per unit length becomes smaller.

By changing voltage values applied to the first photoelectronic modulation module and the second photoelectronic modulation module to change the effective refractive indexes of the first region and the second region in the adjustable ring-shaped resonant cavity 300, optical signals of the TE0 mode and the TE1 mode accumulate phase changes in the adjustable ring-shaped resonant cavity 300. The optical signals of the TE0 mode and TE1 mode interfere in the first straight waveguide 303 and the second straight waveguide 304, respectively, so as to convert the phase changes into intensity changes, thereby changing the resonant wavelength within the adjustable ring-shaped resonant cavity 300.

Figure 7A:
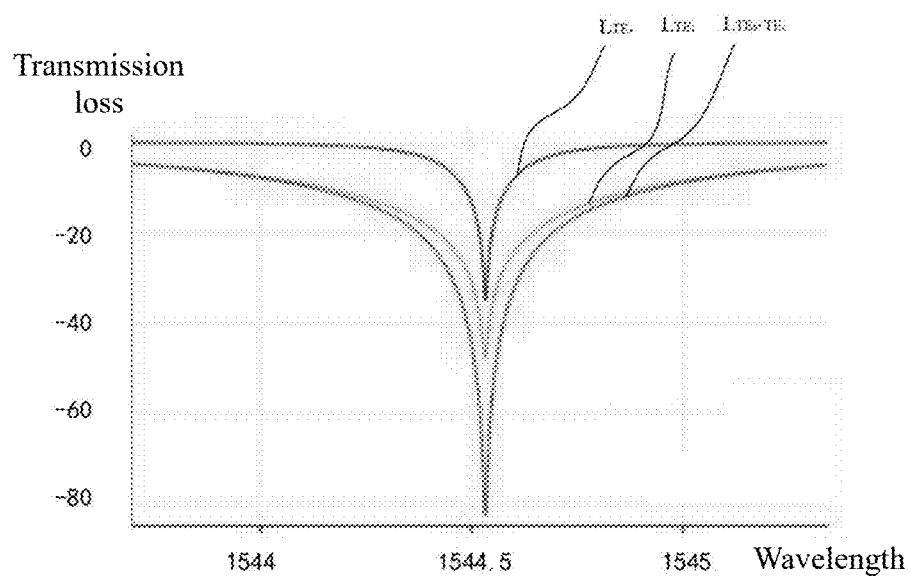
FIG. 7A is a schematic diagram of simulation of resonant spectra provided in another embodiment of the present disclosure.
Figure 7B:
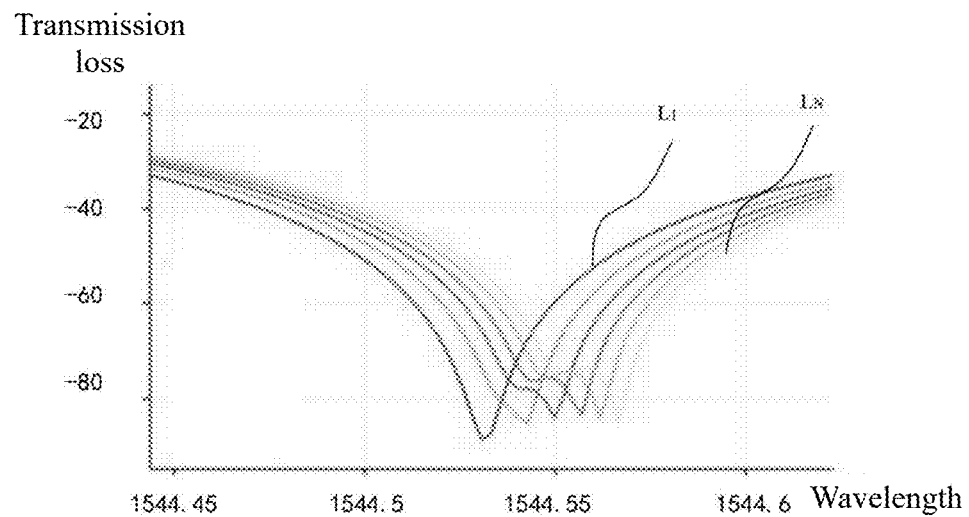
FIG. 7B is a schematic diagram of simulation of the drift of resonant spectra provided in another embodiment of the present disclosure.

Please refer to FIGS. 7A and 7B together, where the horizontal coordinates are wavelengths (in nm) and the vertical coordinates are signal power (in dB). LTE0 and LTE1 are curves of the resonant wavelengths of different modes, LTE0+TE1 is the total resonant spectrum, and L1 to LN are the curves of relationship between different applied voltages and resonant wavelengths.

As shown in FIG. 7A, the resonant wavelengths of the TE0 mode and the TE1 mode coincide exactly, so the first optical signal of the TE0 mode can be acquired by performing resonance processing on the initial wavelength of the TE0 mode, and the first optical signal of the TE0 mode is converted into the second optical signal of the TM0 mode by the first mode converter 400 and the second optical signal of the TE1 mode is coupled into the adjustable ring-shaped resonant cavity 300 via the first output multi-mode waveguide 405; and the adjustable ring-shaped resonant cavity 300 performs resonance processing on the second optical signal and generates a third optical signal to obtain a third optical signal with a high extinction ratio. That is, by performing resonance processing twice on optical signals, an optical signal with a high extinction ratio is obtained, and resonance processing is performed on optical signals of two different modes by the same adjustable ring-shaped resonant cavity 300.

As shown in FIG. 7B, by separately resonating the TE0 mode and the TE1 mode to obtain an optical signal with a high extinction ratio, in the spectrum of this optical signal, the resonant peak gradually drifts with the increase of the reverse voltage. L1 to LN are the curves of relationship between different applied voltages and resonant wavelengths. Specifically, the applied reverse voltage on the curve corresponding to L1 is 0V, and the applied reverse voltage on the curve corresponding to LN is 10V.

In some embodiments, the resonant wavelength gradually increases with the increase of the reverse voltage.

Referring again to FIG. 1, an optical modulator control method includes: receiving an initial optical signal by an input waveguide 100; performing resonance processing on the initial optical signal and outputting a first optical signal, by an adjustable ring-shaped resonant cavity 300; receiving and transmitting the first optical signal to a first mode converter 400 by a feedback loop waveguide 200; performing mode conversion processing on the first optical signal and outputting a second optical signal by the first mode converter 400, and performing resonance processing on the second optical signal and outputting a third optical signal by the adjustable ring-shaped resonant cavity 300; and receiving and outputting the third optical signal by an output waveguide 501.

The initial optical signal is received and transmitted to the adjustable ring-shaped resonant cavity 300 by the input waveguide 100, and the initial optical signal is resonated in the adjustable ring-shaped resonant cavity 300. Since the initial optical signal is a continuous optical signal, after the adjustable ring-shaped resonant cavity 300 performs resonance processing on the initial optical signal, the amplitude of the optical signal of a specific frequency is amplified and the first optical signal is generated. The first optical signal is transmitted to the first mode converter 400 by the feedback loop waveguide 200, and the first mode converter 400 performs mode conversion processing on the first optical signal and outputs the second optical signal. The second optical signal is coupled into the adjustable ring-shaped resonant cavity 300 again, and resonance processing is performed to amplify the amplitude of an optical signal of a specific frequency in the second optical signal to produce the third optical signal, and the third optical signal is output by the output waveguide 501 coupled to the adjustable ring-shaped resonant cavity 300. That is, by multiplexing the adjustable ring-shaped resonant cavity 300 to perform resonance processing on the initial optical signal and the second optical signal simultaneously to amplify the amplitude of the optical signal of a specific frequency, the third optical signal with a higher extinction ratio is obtained.

In some embodiments, the first mode converter 400 may convert the first optical signal into an optical signal of a different orthogonal mode or an optical signal of a different order mode. Since the second optical signal and the initial optical signal are optical signals of different modes, and the adjustable ring-shaped resonant cavity 300 can support transmission of optical signals of multiple modes, when the second optical signal and the initial optical signal are transmitted in the adjustable ring-shaped resonant cavity 300, they are transmitted separately and no interference or crosstalk is generated. The micro-ring-shaped resonant cavity may be a circular adjustable ring-shaped resonant cavity 300 or a runway-type micro-ring-shaped resonant cavity, and the curved waveguide of the micro-ring-shaped resonant cavity supports the transmission of more than two modes in the micro-ring-shaped resonant cavity. By means of mode multiplexing of the adjustable ring-shaped resonant cavity, optical signals of multiple modes can be modulated simultaneously, thereby improving the extinction ratio of the optical signals.

The optical modulator control method further includes: performing mode conversion processing on the third optical signal and outputting a fourth optical signal, by the second mode converter 500, where the input end of the second mode converter 500 is coupled to the output waveguide 501.

In some embodiments, the first mode converter 400 and the second mode converter 500 are the same mode converters that are reversely arranged. The initial optical signal and the first optical signal are optical signals of the TE0 mode. The first mode converter 400 performs mode conversion of the first optical signal and outputs the second optical signal of the TE1 mode or TM0 mode, and the adjustable ring-shaped resonant cavity 300 performs resonance processing on the second optical signal to generate the third optical signal. The input end of the second mode converter 500 is coupled to the output waveguide 501, so as to perform mode conversion processing on the third optical signal and output the fourth optical signal. Specifically, the third optical signal is an optical signal of the TE1 mode or TM0 mode, and the fourth optical signal is an optical signal of the TE0 mode. The first mode converter 400 and the second mode converter 500 are configured such that the initial optical signal and the fourth optical signal have the same mode. That is, the output signal of the optical modulator has the same mode as the input signal.

In addition, during the transmission of the third optical signal in the TE1 mode or TM0 mode to the first mode converter 400 via the feedback loop waveguide 200, the third optical signal is subject to loss to ensure that the output signal of the first mode converter 400 is the first optical signal; and during the transmission of the first optical signal of the TE0 mode to the second mode converter 500 via the output waveguide 501, the first optical signal is subject to optical loss to ensure that the output signal of the second mode converter 500 is the fourth optical signal.

The optical modulator control method further includes: adjusting the refractive index of a first region of the adjustable ring-shaped resonant cavity 300 by configuring a first photoelectronic modulation module; and adjusting the refractive index of a second region of the adjustable ring-shaped resonant cavity 300 by configuring a second photoelectronic modulation module.

In some embodiments, the first photoelectronic modulation module and the second photoelectronic modulation module adjust the refractive indexes of different regions of the adjustable ring-shaped resonant cavity 300, respectively. The refractive indexes of the first region and the second region are adjusted so that the initial optical signal and the second optical signal accumulate phase changes during transmission in the first region and the second region and interfere in the first straight waveguide 303 and the second straight waveguide 304 in the adjustable ring-shaped resonant cavity 300, respectively, so as to convert the phase changes into intensity changes.

The optical modulator control method further includes: the initial optical signal, the first optical signal, and the fourth optical signal being in the TE0 mode; and the second optical signal and the third optical signal being in either the TM0 mode or the TE1 mode. The optical signals are converted by the first mode converter 400 and the second mode converter 500 so that the optical signals of different modes are resonated in the adjustable ring-shaped resonant cavity 300 and do not interfere with each other.

In some embodiments, the first mode converter 400 and the second mode converter 500 are the same mode converters that are reversely arranged. The initial optical signal and the first optical signal are optical signals of the TE0 mode. The first mode converter 400 performs mode conversion of the first optical signal and outputs the second optical signal of the TE1 mode or TM0 mode, and the adjustable ring-shaped resonant cavity 300 performs resonance processing on the second optical signal to generate the third optical signal. The input end of the second mode converter 500 is coupled to the output waveguide 501, so as to perform mode conversion processing on the third optical signal and output the fourth optical signal. Specifically, the third optical signal is an optical signal of the TE1 mode or TM0 mode, and the fourth optical signal is an optical signal of the TE0 mode. The first mode converter 400 and the second mode converter 500 are configured such that the initial optical signal and the fourth optical signal have the same mode. That is, the output signal of the optical modulator has the same mode as the input signal.

The embodiments of the present disclosure include the following technical scheme. The adjustable ring-shaped resonant cavity performs resonance processing on the initial optical signal and outputs the first optical signal, the first mode converter performs mode conversion processing on the first optical signal and outputs the second optical signal, and the adjustable ring-shaped resonant cavity performs resonance processing on the second optical signal and outputs the third optical signal, that is, the adjustable ring-shaped resonant cavity performs resonance and modulation processing twice on the optical signal, thereby improving the extinction ratio of the optical signal. That is, by means of mode multiplexing of the adjustable ring-shaped resonant cavity, optical signals of multiple modes can be modulated simultaneously, thereby improving the extinction ratio of the optical signals.

The apparatus embodiments described above are only for illustration. The units described as separate components may or may not be physically separated, that is, they may be located at one place or distributed to multiple network units. Some or all of the modules can be selected according to actual needs to achieve the purpose of this embodiment.

It can be understood by those having ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software can be distributed on computer-readable media, which can include computer-readable storage media (or non-transitory media) and communication media (or transitory media). As well known to those of ordinary skill in the art, the term computer storage medium includes volatile and nonvolatile, removable and non-removable media implemented in any method or technology configured to store information, such as computer readable instructions, data structures, program modules or other data. A computer storage medium includes, but is not limited to, RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information transmission media.

The above is a detailed description of some embodiments of the present disclosure, but the present disclosure is not limited to the above-mentioned embodiments. Those of ordinary skill in the art can also make various equivalent modifications or replacements without departing from the scope of the present disclosure, and these equivalent modifications or replacements are all included in the scope defined by the claims of the present disclosure.

The invention claimed is:

1. An optical modulator, comprising:
an input waveguide, configured to receive an initial optical signal;
an adjustable ring-shaped resonant cavity, coupled to the input waveguide and configured to perform resonance and modulation processing on the initial optical signal and output a first optical signal;
a feedback loop waveguide, coupled to the adjustable ring-shaped resonant cavity and configured to receive and transmit the first optical signal;
a first mode converter, coupled to the feedback loop waveguide and configured to perform mode conversion processing on the first optical signal and output a second optical signal to the adjustable ring-shaped resonant cavity;
the adjustable ring-shaped resonant cavity being further configured to perform resonance and modulation processing on the second optical signal and output a third optical signal;
an output waveguide, coupled to the adjustable ring-shaped resonant cavity and configured to receive and output the third optical signal; and
a second mode converter, of which an input end is coupled to the output waveguide, and configured to perform mode conversion processing on the third optical signal and output a fourth optical signal.

2. The optical modulator of claim 1, wherein the first mode converter and the second mode converter are the same mode converters that are reversely arranged.

3. The optical modulator of claim 1, wherein the adjustable ring-shaped resonant cavity comprises a first coupling region and a second coupling region;
the adjustable ring-shaped resonant cavity is coupled to the input waveguide by the first coupling region;
the adjustable ring-shaped resonant cavity is coupled to the feedback loop waveguide by the first coupling region; and
the first mode converter is coupled to the adjustable ring-shaped resonant cavity by the second coupling region, and the adjustable ring-shaped resonant cavity is coupled to the output waveguide by the second coupling region.

4. The optical modulator of claim 3, wherein the adjustable ring-shaped resonant cavity further comprises:
a first photoelectronic modulation module, a second photoelectronic modulation module, and a ring-shaped resonant cavity,
wherein the first photoelectronic modulation module is configured to adjust a refractive index of a first region of the ring-shaped resonant cavity;
the second photoelectronic modulation module is configured to adjust a refractive index of a second region of the ring-shaped resonant cavity; and
the first region is connected to the first coupling region and the second coupling region separately, and the second region is connected to the first coupling region and the second coupling region separately.

5. The optical modulator of claim 4, wherein the first photoelectronic modulation module and the second photoelectronic modulation module are both silicon-based photoelectronic modulation modules; and
the silicon-based photoelectronic modulation modules each comprise the following regions that are arranged in sequence:
a first P-type heavily doped region,
a first P-type lightly doped region,
a first N-type lightly doped region, and
a first N-type heavily doped region.

6. The optical modulator of claim 5, wherein the first P-type lightly doped region comprises at least two surfaces, and the first N-type lightly doped region covers the at least two surfaces of the first P-type lightly doped region; or
the first N-type lightly doped region comprises at least two surfaces, and the first P-type lightly doped region covers the at least two surfaces of the first N-type lightly doped region.

7. The optical modulator of claim 1, wherein the input waveguide comprises:

a single-mode input waveguide configured to receive an initial optical signal;
a first tapered waveguide, wherein an end of the first tapered waveguide is connected to the single-mode input waveguide; and
a multi-mode input waveguide, wherein the multi-mode input waveguide is connected to another end of the first tapered waveguide.

8. The optical modulator of claim 7, wherein the feedback loop waveguide comprises:
a feedback multi-mode waveguide, wherein one end of the feedback multi-mode waveguide is connected to the multi-mode input waveguide;
a second tapered waveguide, wherein an end of the second tapered waveguide is connected to another end of the feedback multi-mode waveguide; and
an arc-shaped waveguide, wherein an end of the arc-shaped waveguide is connected to another end of the second tapered waveguide, and
wherein another end of the arc-shaped waveguide is connected to the first mode converter.

9. The optical modulator of claim 1, wherein the first mode converter comprises:
a first input single-mode waveguide, wherein an end of the first input single-mode waveguide is connected to the feedback loop waveguide;
a first single-mode coupling waveguide, wherein an end of the first single-mode coupling waveguide is connected to another end of the first input single-mode waveguide;
a first multi-mode coupling waveguide coupled to the first single-mode coupling waveguide;
a first conversion tapered waveguide, wherein an end of the first conversion tapered waveguide is connected to the first multi-mode coupling waveguide; and
a first output multi-mode waveguide, wherein an end of the first output multi-mode waveguide is connected to another end of the first conversion tapered waveguide, and another end of the first output multi-mode waveguide is connected to the output waveguide.

10. The optical modulator of claim 1, wherein the first mode converter comprises:
a first input single-mode waveguide, wherein an end of the first input single-mode waveguide is connected to the feedback loop waveguide;
a first single-mode coupling waveguide, wherein an end of the first single-mode coupling waveguide is connected to another end of the first input single-mode waveguide;
a first multi-mode coupling waveguide coupled to the first single-mode coupling waveguide; and
a first output multi-mode waveguide, wherein an end of the first output multi-mode waveguide is connected to an end of the first multi-mode coupling waveguide, and another end of the first output multi-mode waveguide is connected to the output waveguide.

11. The optical modulator of claim 1, wherein the second mode converter comprises:
a second input multi-mode waveguide, wherein an end of the second input multi-mode waveguide is connected to the output waveguide;
a second conversion tapered waveguide, wherein an end of the second conversion tapered waveguide is connected to another end of the second input multi-mode waveguide;
a second multi-mode coupling waveguide, wherein an end of the second multi-mode coupling waveguide is connected to another end of the second conversion tapered waveguide;
a second single-mode coupling waveguide, wherein the second single-mode coupling waveguide is coupled to the second multi-mode coupling waveguide; and
a second output single-mode waveguide, wherein an end of the second output single-mode waveguide is connected to an end of the second single-mode coupling waveguide.

12. The optical modulator of claim 1, wherein the second mode converter comprises:
a second input multi-mode waveguide, wherein an end of the second input multi-mode waveguide is connected to the output waveguide;
a second multi-mode coupling waveguide, wherein an end of the second multi-mode coupling waveguide is connected to another end of the second input multi-mode waveguide;
a second single-mode coupling waveguide, wherein the second single-mode coupling waveguide is connected to the second multi-mode coupling waveguide; and
a second output single-mode waveguide, wherein an end of the second output single-mode waveguide is connected to an end of the second single-mode coupling waveguide.

13. An optical modulator control method, comprising:
receiving an initial optical signal by an input waveguide;
performing resonance and modulation processing on the initial optical signal and outputting a first optical signal, by an adjustable ring-shaped resonant cavity;
receiving and transmitting the first optical signal to a first mode converter, by a feedback loop waveguide;
performing mode conversion processing on the first optical signal and outputting a second optical signal, by the first mode converter;
performing resonance and modulation processing on the second optical signal and outputting a third optical signal, by the adjustable ring-shaped resonant cavity;
receiving and outputting the third optical signal by an output waveguide; and
performing mode conversion processing on the third optical signal and outputting a fourth optical signal, by a second mode converter.

14. The optical modulator control method of claim 13, wherein the first mode converter and the second mode converter are the same mode converters that are reversely arranged.

* * * * *